(12) United States Patent
Merkey

(10) Patent No.: US 6,728,959 B1
(45) Date of Patent: *Apr. 27, 2004

(54) METHOD AND APPARATUS FOR STRONG AFFINITY MULTIPROCESSOR SCHEDULING

(75) Inventor: Jeffrey V. Merkey, Orem, UT (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1292 days.

(21) Appl. No.: 08/512,369

(22) Filed: Aug. 8, 1995

(51) Int. Cl.$^7$ ................................. G06F 9/00

(52) U.S. Cl. ................ 718/102; 718/100; 718/107

(58) Field of Search ................. 395/672, 673, 395/674

(56) References Cited

U.S. PATENT DOCUMENTS

| | | | |
|---|---|---|---|
| 5,055,999 A | 10/1991 | Frank et al. | 364/200 |
| 5,119,481 A | 6/1992 | Frank et al. | 395/325 |
| 5,157,663 A | 10/1992 | Major et al. | 371/9.1 |
| 5,226,039 A | 7/1993 | Frank et al. | 370/60 |
| 5,251,308 A | 10/1993 | Frank et al. | 395/425 |
| 5,276,607 A | 1/1994 | Harris et al. | 364/401 |
| 5,282,201 A | 1/1994 | Frank et al. | 370/94.1 |
| 5,297,265 A | 3/1994 | Frank et al. | 395/400 |
| 5,335,325 A | 8/1994 | Frank et al. | 395/200 |
| 5,341,483 A | 8/1994 | Frank et al. | 395/400 |
| 5,355,501 A | 10/1994 | Gross et al. | 395/750 |
| 5,379,428 A * | 1/1995 | Belo | 395/650 |
| 5,404,521 A | 4/1995 | Murray | 395/650 |

FOREIGN PATENT DOCUMENTS

| | | | |
|---|---|---|---|
| EP | 0 527 301 A3 | 2/1993 | ............ G06F/9/46 |
| GB | 2 284 081 | 5/1995 | ............ G06F/9/46 |

OTHER PUBLICATIONS

Leung, An Execution Sleep Scheduling Policy for Serving an Additional Job in Priority Queuing Systems, ACM vol. 10 No. 2, Apr. 1993.*
Cheng et al, Scheduling in Parallel Systems with a Herarchical Organization of Tasks, ACM, 1992.*
Rudolph et al, A Simple Load Balancing Scheme for Task Allocation in Parallel Machines, ACM, 1991.*
Squillante et al., Analysis of Task Migration in Shared Memory Multiprocessor Scheduling, ACM, 1991.*
Draves et al, Using Continuations to Implement Thread Management and Communication in Operating Systems, ACM, 1991.*
Baumgartner et al, A Global Load Balancing Strategy for a Distributed Computer System, 1988, Future Trends of Dist. Comp. Syst., pp 95–102.*

(List continued on next page.)

Primary Examiner—Majid A. Banankhah
(74) Attorney, Agent, or Firm—Dinsmore & Shohl LLP

(57) ABSTRACT

A method and apparatus for scheduling threads on a multiprocessor utilize an unlocked local queue for each processor in the multiprocessor and a lockable global dispatch queue accessible by all processors. Threads are selected for movement from the unlocked local queue to the global dispatch queue only when the unlocked local queue contains too many threads that are waiting for a processor. Threads are selected to run on an available processor only after repeated checks to make certain no threads in the processor's unlocked local queue should be run first. As a result, threads assigned to a processor tend to stay with that processor unless the system load is severely unbalanced, thereby improving system performance by increasing cache hits and decreasing lock assertions.

11 Claims, 8 Drawing Sheets

OTHER PUBLICATIONS

Anderson et al, The Performance Implications of Thread Management Alternatives for Shared Memory Multiprocessors, IEEE Trans. on Comp. pp 1631–1644, 12/89 v38 I 12.*

Dandamudi et al, A Hierarchical Task Queue Organization for Shared–Memory Multiprocessor Systems, IEEE Trans. on Parallel and Distributed Systems 1/95 v6 I1.*

Adve et al Comparison of Hardware and Software Cache Coherence Schemes, ACM 1991.*

Vaswani et al. The Implications of Cache Affinity on Processor Scheduling for Multiprogrammed Shared Memory Multiprocessors ACM 1991.*

Thekkath et al. Impact of Sharing–Based Thread Placement on Multithreaded Architectures, IEEE 1994.*

Philbin, Customizable Policy Management in the Sting Operating System, Proc. of US/Japan Worksop on Parallel Computing Languages, 10/92.*

Hac et al, Dynamic Load Balancing in a Distributed System Using a Sender–Initiated Algorithm IEEE 1988.*

Baron et al, Mach Kernel Interface Manual, Carnege Melon University Aug. 13, 1990, pp. 1–6.*

Chandra et al, Scheduling and Page Migration for Multiprocessor Compute Servers, Asplos 10/94.*

"Novell Demos SMP Tricks", Bradley F. Shimmin, *LAN Times,* Mar. 27, 1995, vol. 12, Issue 6, pp. 143–144.

"Distributed Operating Systems", Andrew W. Tanenbaum, 1995 Prentice–Hall, Inc., pp. 1–33, 169–212, 234–240, 262–268, 388–392, 425–427, 431–445, 483–490, 527–535.

"Operating System Concepts", Abraham Silberschatz et al., Addison–Wesley 1994, pp. 111–116, 125–126, 131–215, 507–523, 659–689.

"The Xthreads Library: Design, Implementation, and Applications", Sang, J., et al., IEEE COMPSAC, 1993, pp. 173–179.

"Cilk: An Efficient Multithreaded Runtime System", R. Blumofe et al., *ACM SIG Plan Notices vol. 30, No. 8,* Aug. 1995, pp. 207–216.

"Scheduling Support for Concurrency and Parallelism in the Mach Operating System", D. Black, *Computer,* May 1990, pp. 35–43.

* cited by examiner

METHOD AND APPARATUS FOR STRONG AFFINITY MULTIPROCESSOR SCHEDULING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The copyright owner does not hereby waive any of its rights to have this patent document maintained in secrecy, including without limitation its rights pursuant to 37 C.F.R. § 1.14.

FIELD OF THE INVENTION

The present invention relates to the allocation and scheduling of processors in a multiprocessing computer system, and more particularly to a thread-scheduling invention which creates a strong affinity between each thread and the processor which is initially allocated to the thread.

TECHNICAL BACKGROUND OF THE INVENTION

Hardware

Many computing systems contain a single central processing unit ("CPU" or "processor"), a primary storage unit directly accessible to the processor, and a secondary storage unit for long-term bulk storage of information. The primary storage typically includes random access memory ("RAM") and the secondary storage typically includes a magnetid disk, optical disk, or similar-device.

To create more powerful computing systems, these individual architectural components—processors, memories, and disks—have been and are being combined and connected in various ways. A major goal of these alternative architectures is to support parallel processing, that is, processing performed by several processors which are working on different pieces of a given problem at the same time. A parallel processing system is said to be "scalable" if adding additional processors clearly improves the system's performance.

Some parallel processing architectures are generally termed "multiprocessors" or "multiprocessing systems." Multiprocessors contain at least two processors which communicate with one another through a "shared memory." Shared memory makes a single virtual address space available to multiple processors, allowing each processor to read and write values at address locations that are accessible to all processors and addressed identically by each processor. Each processor in a multiprocessing system may also have a local private memory, known as its "cache," which is not shared with the other processors.

Multiprocessors may be connected to each other and/or to single processor systems in a local area network, wide area network, on the Internet, or by other means. Processors which communicate with each other but do not have a common shared memory form a "multicomputing system." Thus, a local area network is one of many possible types of multicomputing systems. Multiprocessing systems and multicomputing systems are known collectively as "distributed systems."

Multiprocessors may be "bus-based" or "switched." One bus-based multiprocessor is illustrated in FIG. 1. The multiprocessor, which is indicated generally at 10, includes four processors 12, each of which has its own cache 14. The caches communicate through signal lines 15 using MESI or another familiar protocol. The processors 12 communicate with one another through a shared memory unit 16 which is on a common bus. 17 with the processors 12. The shared memory unit 16 typically includes a memory bus controller and RAM.

The bus 17 also provides communication between the processors 12 and/or shared memory 16, on the one hand, and a drive 18 capable of reading a medium 19, on the other hand. Typical drives 18 include floppy drives, tape drives, and optical drives. Typical media 19 include magnetic and optical computer-readable media.

To read the value of a word from the memory 16, a particular processor such as CPU 1 puts the memory address of the desired word onto the bus 17 and signals that a read is desired. In response, the memory 16 places the value of the addressed word onto the bus 17, thereby allowing the processor CPU 1 to read the value. Writes to the shared memory 16 are performed in a similar way.

Unfortunately, if shared memory 16 reads and writes are performed only by using this simple approach, then performance of the multiprocessor 10 drops dramatically as additional processors 12 are added. When too many processors 12 are present, the bus 17 cannot transfer information between the processors 12 and the shared memory 16 as rapidly as requested by the processors 12. System performance then drops because some of the system's processors 12 are idle while they wait for access to the shared memory 16.

To reduce the load on the bus 17, copies of the values read or written by a given processor such as CPU 1 may be kept in that processor's cache 14. Each value is stored in the cache 14 with some indication of the address at which that value is kept in the shared memory 16. Addresses corresponding to values stored in the cache 14 are called "cached addresses," while the values stored in the cache 14 are called "cached values." If the address specified in a read request is a cached address, the corresponding cached value is read from the cache 14 and no request is placed on the bus 17.

Although caching may dramatically reduce the load on the bus 17, it also introduces potential inconsistencies. Imagine that processors CPU 1 and CPU 2 each read the word at address A0 from the shared memory 16 and that the value read is zero. Then the cache of CPU 1 and the cache of CPU 2 will each indicate that the value stored at address A0 is zero. Suppose CPU 1 then writes the value one to address A0 of the shared memory 16. Then the cache of CPU 1 and the shared memory 16 will each indicate that the value stored at address A0 is one, while the cache of CPU 2 will still indicate that the value stored at A0 is zero.

Using one or both of two approaches, known as "write-through caches" and "snooping caches," will prevent such inconsistencies on bus-based multiprocessing systems unless the number of processors is too large. If the number of processors grows too large, alternative architectures may be used. One alternative multiprocessing architecture, known as a "crossbar switch," is indicated generally at 20 in FIG. 2. A shared memory is divided into modules 22 which are connectable to processors 24 by signal lines 26. The signal lines 26 may be connected as needed by actuating appropriate crosspoint switches 28.

Another alternative multiprocessing architecture, known as an "omega switching network," is indicated generally at 30 in FIG. 3. Shared memory is again divided into modules 32 which are connectable to processors 34 by signal lines 36. The signal lines 36 may be connected as needed by actuating appropriate 2×2 switches 38. In either the crossbar switch multiprocessor 20 (FIG. 2) or the omega multiprocessor 30 (FIG. 3), some or all of the processors 24, 34 may have a cache similar to the caches 14 in the bus-based multiprocessor 10 (FIG. 1). The multiprocessors 20, 30 may also include a drive such as the drive 18 (FIG. 1) for reading computer-readable media such as the medium 19.

Software Generally

Although its underlying hardware limits the theoretical performance of a multiprocessor, in practice limitations imposed by an "operating system" are more frequently encountered. The operating system is software which (among other duties) controls access to the processors. The presence of multiple processors that are capable in theory of working in parallel on a given computational problem does not, in and of itself, make parallel processing a practical reality. The problem must be broken into appropriate parts, the parts must then be efficiently distributed among the processors, and the results of the separate computations must finally be combined to provide a solution to the problem.

Computational problems may be divided into "tasks," each of which in turn contains one or more "threads." Each task has its own address space; the address spaces of separate tasks are typically disjoint. Tasks often have other components as well, such as global variables, associated files, communication ports, semaphores, and accounting information. Each thread has some executable code and a set of register values. The register values include a program counter value that indicates which point the thread has reached in its progress through the executable code. Threads may also have associated state information such as a function call stack.

A variety of approaches have been tried for allocating processors to tasks and threads. When the processing requirements of a problem are precisely known before computation to solve the problem is performed, deterministic approaches such as certain graph-theoretic algorithms can be used to efficiently allocate processors to threads or tasks which will collectively solve the problem. However, in most cases the information needed by deterministic approaches is not available until after the computations have finished.

Because deterministic approaches are rarely practical, a variety of non-deterministic "heuristic" approaches are used to allocate processors to threads and/or tasks. One centralized approach tries to allocate processors fairly among all waiting users. Under this approach, a user who is not currently using any processors but has been waiting a long time for a processor will always be given the next available processor. The usage information needed to allocate processors fairly is maintained in one central location. To increase the fairness of processor allocation, this approach sometimes stops a thread or task before it has finished using a given processor, saves appropriate state information, and then gives that processor to a different thread or task.

Under many allocation schemes, a given processor may be allocated to a group of threads rather than being dedicated to an individual thread. In such cases, steps must be taken to schedule the use of that processor by the individual threads in the group, since only one thread can run at a time on any particular processor. Deterministic scheduling approaches exist which theoretically optimize efficiency, but which are not practical because they require more information than is typically available.

Mach Software

One heuristic approach to processor scheduling in a multiprocessor system is embodied in the Mach operating system presently under development at Carnegie-Mellon University and elsewhere. Each processor is assigned to exactly one "processor set." Processor sets are then allocated to threads. Each processor set therefore has a set of threads to execute, and steps must be taken to schedule use of the processors by the threads. Goals of Mach scheduling include assigning processor cycles to threads in a fair and efficient way while nonetheless recognizing different thread priorities.

Each thread has a priority level ranging from 0 (highest priority) to 31 (lowest priority). Each processor set has an associated array of global run queues. FIG. 4 illustrates an array 40 of global run queues 42 for a processor set P1. Each run queue 42 contains zero or more threads 44 waiting to use a processor in the processor set. Mach defines similar arrays for each of the other processor sets.

Each global run queue 42 corresponds to a different priority level. When a thread at a given priority is ready to run, it is placed at the end of the corresponding run queue. Threads which are not ready to run are not present on any of the run queues 42. In the example shown, a priority-three run queue 46 contains two priority-three threads 48 that are ready to run, and a priority-eight run queue 50 contains two priority-eight threads 52 which are ready to run. Two other run queues 42 also contain at least one thread 44; the remaining run queues 42 are presently empty.

Each Mach array 40 has three associated variables: an array mutex, a thread count, and a hint. The array mutex (derived from "mutual exclusion") is used to lock the array 40 so that only one processor can access the run queues 42 at a time. The thread count holds the total number of threads 44 currently in the run queues 42 of the array 40. The hint holds a priority level indicating where a Mach scheduler should start looking for the highest priority thread. The highest priority thread will be located either in the run queue for the hint priority level or in a lower priority run queue.

The global run queues 42 may be used by each of the one or more processors in the processor set. In addition, each individual processor Pn has its own local run queues. The local run queues are similarly arranged in priority levels from zero through thirty-one. Each local run queue for processor Pn holds "bound" threads, namely, threads that are permanently bound to processor Pn. Typical bound threads include device drivers for I/O devices that are physically accessible only to processor Pn. Bound threads are never placed in one of the global run queues 42.

Mach utilizes the run queues 42 and other structures to perform processor scheduling as follows. Each thread 44 is allocated a maximum quantum of time during which it can have continual use of a processor. When a thread 44 blocks or exits voluntarily, or is preempted because it has run continually for one quantum, the scheduler searches certain run queues to locate the next thread 44 that will be given the processor. If a thread 44 is found at any time during this search, the processor is allocated to that thread 44 and the search ends.

The Mach scheduler looks first in the processor's local run queues. If any threads 44 are found, the first thread 44 in the highest priority local run queue is given the processor.

The check for threads 44 in the local run queues begins by checking to see whether the local thread count is zero. If it is, the local run queues are all empty. Otherwise, the scheduler uses the local hint value to find the first thread 44 in whichever non-empty local run queue has the highest priority.

If all of the local run queues are empty, then the same steps are repeated to search the global run queues 42 for the processor set that contains the processor. If there are no threads 44 in either the local run queues or the global run queues, and if a non-scheduler thread was not preempted to perform the search, then the scheduler repeats the search, possibly after waiting for some predefined period of time. If a ready-to-run thread 44 is located, that thread 44 is allowed to run for at most one time quantum. Then it is stopped and the whole search process is repeated.

Mach regularly decreases the priority of the currently running thread 44. Thus, the longer a thread 44 runs, the less successful it is likely to be when competing with other threads 44 for a processor. However, some threads 44 have a limited ability to temporarily increase their own priority, after which their original (lower) priority is restored. A thread 44 may also name another thread 44 as its successor. If a successor thread 44 is named, the local and global run queues are not searched. Instead, the processor is simply given to the successor for at most one quantum of time.

Mach's approach to scheduling has two major drawbacks. First, Mach continually preempts threads which are doing useful work, sets them to one side, and then spends valuable processor time performing the searches just described. From a user's perspective, the time spent searching is undesirable administrative overhead that decreases the overall performance of the multicomputing system.

The processor made to do the search is prevented from working on the user's problem during the search. Moreover, the scheduler must lock the global run queues 42 while the search is performed. If other processors in the same processor set try to access the locked global run queues 42, they must wait until the first processor finishes. Thus, the search may reduce the efficiency of several processors even though it seeks a thread to run on just one processor.

The second drawback to Mach's approach is even more destructive of multiprocessor efficiency. Under Mach, threads 44 tend to migrate from one processor to another processor over time. Bound threads (those in local run queues) only run on a particular processor, but load-balancing concerns traditionally limit such bound threads 44 to device drivers and other threads 44 that simply will not run on other processors. Most threads 44 are not bound, but are allowed to run on any available processor in the processor set.

Unfortunately, moving threads 44 between processors may severely degrade system performance because it undercuts the performance gains that would otherwise arise from processor cache usage. With reference to FIGS. 1 and 4, those of skill in the art will appreciate that running a thread 44 on a given processor 12 tends to fill that processor's cache 14 with the data needed by the thread 44. Over time, the thread 44 therefore tends to receive data from the cache 14 rather than the shared memory 16. As discussed, the cache 14 thereby improves performance of the system 10 by reducing the load on the bus 17. Similar performance gains arise when local processor caches are used in other multicomputing systems, including the systems 20 and 30 shown in FIGS. 2 and 3, respectively.

Moving a thread 44 to a new processor forces the thread 44 to reacquire needed data from the shared memory 16, 22, 32. The data must be reloaded into the processor's cache before the benefits of caching become available again. Indeed, the processor not only acts as though it had no cache during this reloading process, but actually performs worse than similar cache-less processors because of the need to reload the cache.

Thus, it would be an advancement in the art to provide a method and apparatus for thread scheduling which reduces the movement of threads between processors in a multiprocessor.

It would also be an advancement to provide such a method and apparatus which reduces the time during which processors in a multiprocessor are unable to work because thread scheduling is underway.

Such a method and apparatus for multiprocessor scheduling are disclosed and claimed herein.

BRIEF SUMMARY OF THE INVENTION

The present invention provides a method and apparatus for scheduling the execution of a plurality of threads on a plurality of processors in a multiprocessor computer system. One method of the present invention includes associating an unlocked local queue of threads with each of the processors and maintaining a global dispatch queue of threads which are not presently associated with any processor. The unlocked local queue is accessed only by the processor in question and therefore requires no corresponding mutex or other semaphore to maintain its data integrity. Thus, the number of locks asserted by the multiprocessor's operating system under the present invention is significantly less than under different approaches, and provides the multiprocessor with a corresponding performance increase.

The method of the present invention also includes selecting movable threads from the unlocked local queues according to predetermined criteria which tend to restrict the mobility of threads. A thread is moved from its unlocked local queue to the global dispatch queue only if different processors are facing very disparate loads. This creates a strong affinity between processors and threads, which in turn provides the multiprocessor with a performance boost by increasing processor cache usage and decreasing shared memory accesses.

In one embodiment of the present invention, the global dispatch queue is a lockable queue to prevent it from being changed by more than one thread at a time. Moving a selected thread is accomplished by locking the global dispatch queue, by then deleting the selected thread from its unlocked local queue and inserting it in the global dispatch queue, and finally unlocking the global dispatch queue. Locking and unlocking involve obtaining and releasing, respectively, a mutex variable that is associated with the global dispatch queue.

The selection of movable threads includes identifying a busiest processor among the plurality of processors. Movable threads are selected only from eligible-to-run threads in the unlocked local queue of the busiest processor. One embodiment identifies the busiest processor as that processor which has received the smallest number of sleep requests of any of the processors during a sampling period. Another embodiment identifies the busiest "popular" processor among the plurality of processors. A processor is "popular" when its unlocked local queue contains at least two threads which are eligible to run. The movable threads are then selected only from the eligible threads in the unlocked local queue of the busiest popular processor.

Selection of a thread to which control of an available processor will be yielded is accomplished by searching for a suitable thread until one is found and then switching the processor's context to the new thread. One method of the present invention searches, in a predetermined order, at least a portion of the union of the global dispatch queue and the unlocked local queue of the processor to locate at least one eligible thread. Control of the processor is given to an eligible thread found during the search. One embodiment requires that control be yielded to at least one thread that was not found in the global dispatch queue between each pair of instances in which control is yielded to threads found in the global dispatch queue.

According to the present invention, one approach to searching includes checking the global dispatch queue for an eligible thread. If no eligible thread is found in the global dispatch queue, the searching step checks the unlocked local queue of the processor.

A second approach to searching may be used in embodiments of the present invention which associate a lockable local queue of threads with each of the processors. The lockable local queue is used rather than the unlocked local queue when other processors need to bind a thread, such as a device driver, to the given processor. The unlocked local queues are still present; use of the lockable local queues is typically rare. This alternative approach to searching includes checking the lockable local queue of the processor for an eligible thread, checking the global dispatch queue if no eligible thread is found in the lockable local queue, and then checking the unlocked local queue if no eligible thread is found in the global dispatch queue.

Under either approach, searching may also include determining whether checking the global dispatch queue will exceed a predetermined relative frequency for global dispatch queue accesses. The global dispatch queue is checked only if checking will not exceed the predetermined relative frequency for global dispatch queue accesses and, under the second approach, if no eligible thread is found in the lockable local queue.

The present invention also covers devices and articles for scheduling threads. The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Hardware

The present invention relates to a method and apparatus for scheduling the use of processors in a multiprocessor computing system by a plurality of threads. Suitable multiprocessors include, without limitation, the bus-based multiprocessor 10, the crossbar switch multiprocessor 20, and the omega switching network multiprocessor 30 illustrated in FIGS. 1–3.

Figure 1:
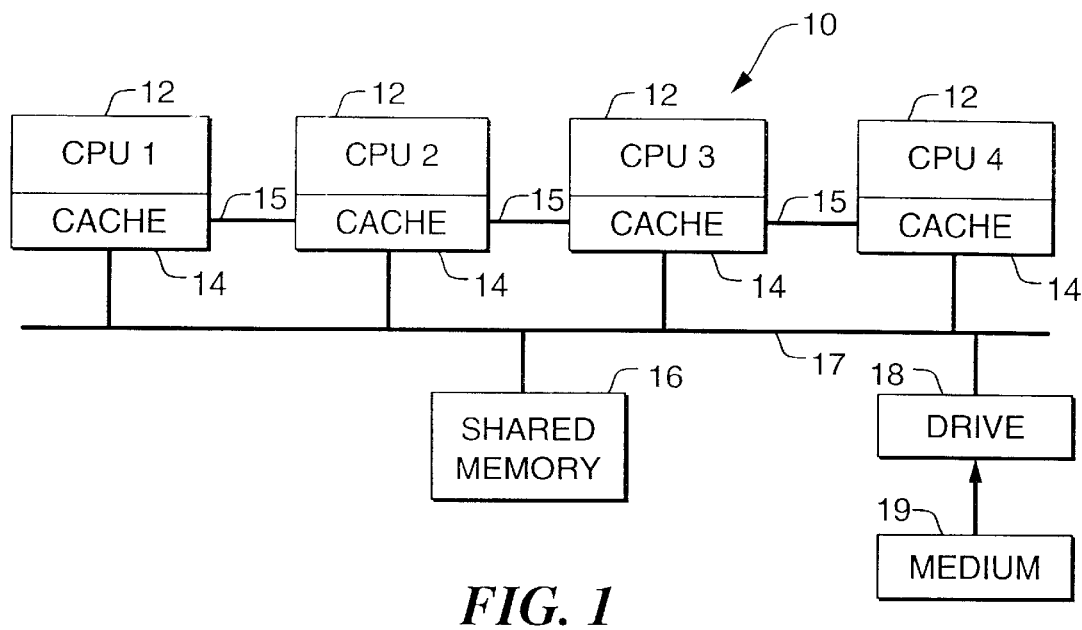
FIG. 1 is a diagram illustrating a bus-based multiprocessor architecture.
Figure 2:
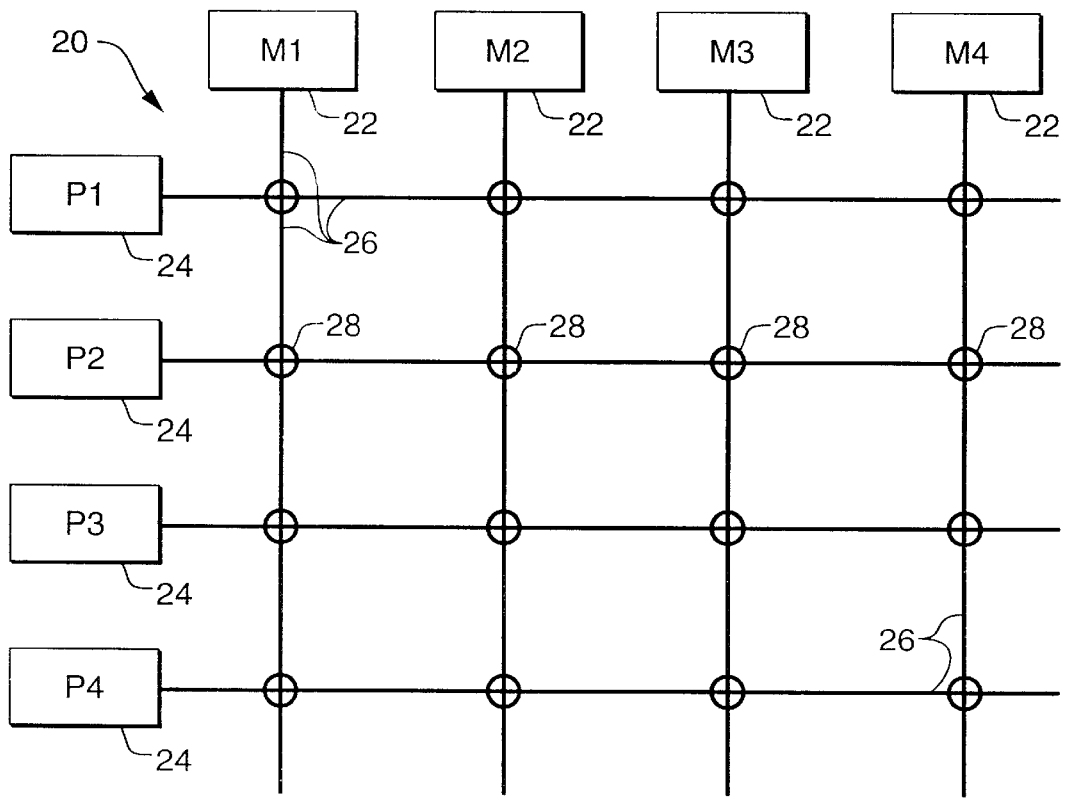
FIG. 2 is a diagram illustrating a crossbar switch multiprocessor architecture.
Figure 3:
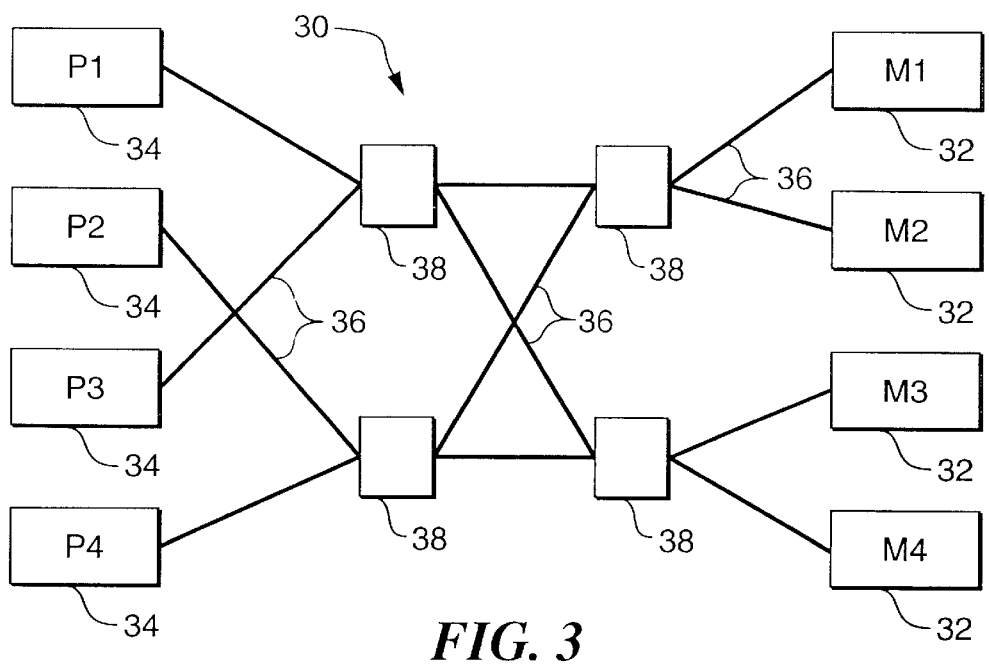
FIG. 3 is a diagram illustrating an omega switching network multiprocessor architecture.
Figure 4:
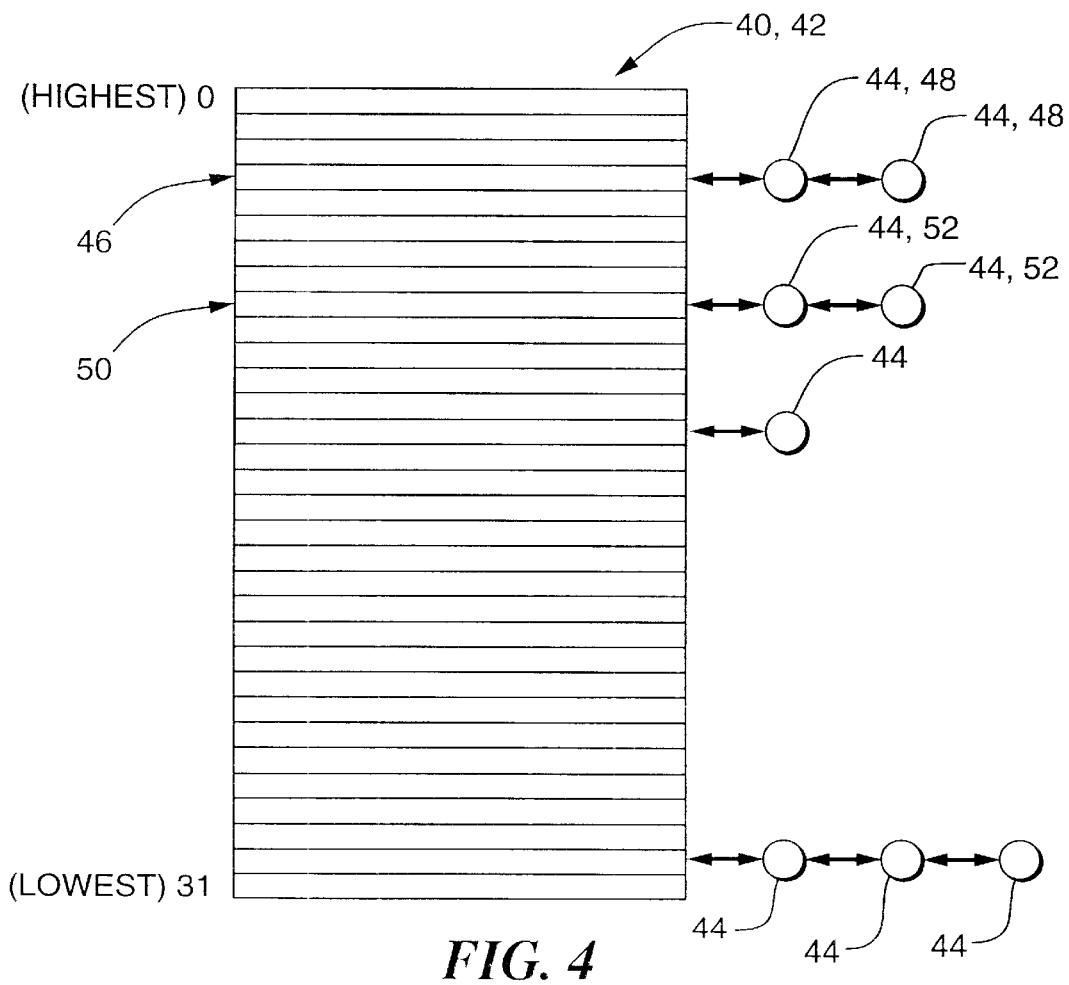
FIG. 4 is a diagram illustrating an array of run queues utilized by the Mach operating system.

To aid understanding of the invention through specific examples of the hardware used, FIGS. 1–3 show four processors 12, 24, 34 in each of the multiprocessors 10, 20, 30, and the present disclosure assumes at certain points that the multiprocessor being used has 32 processors. However, those of skill in the art will appreciate that the present invention is useful in connection with a wide variety of multiprocessors having two or more processors. In addition, although it is preferred that each processor have its own cache, the present invention is also useful in connection with multiprocessors in which some or all of the processors lack a cache.

Scheduling Structures

Figure 5:
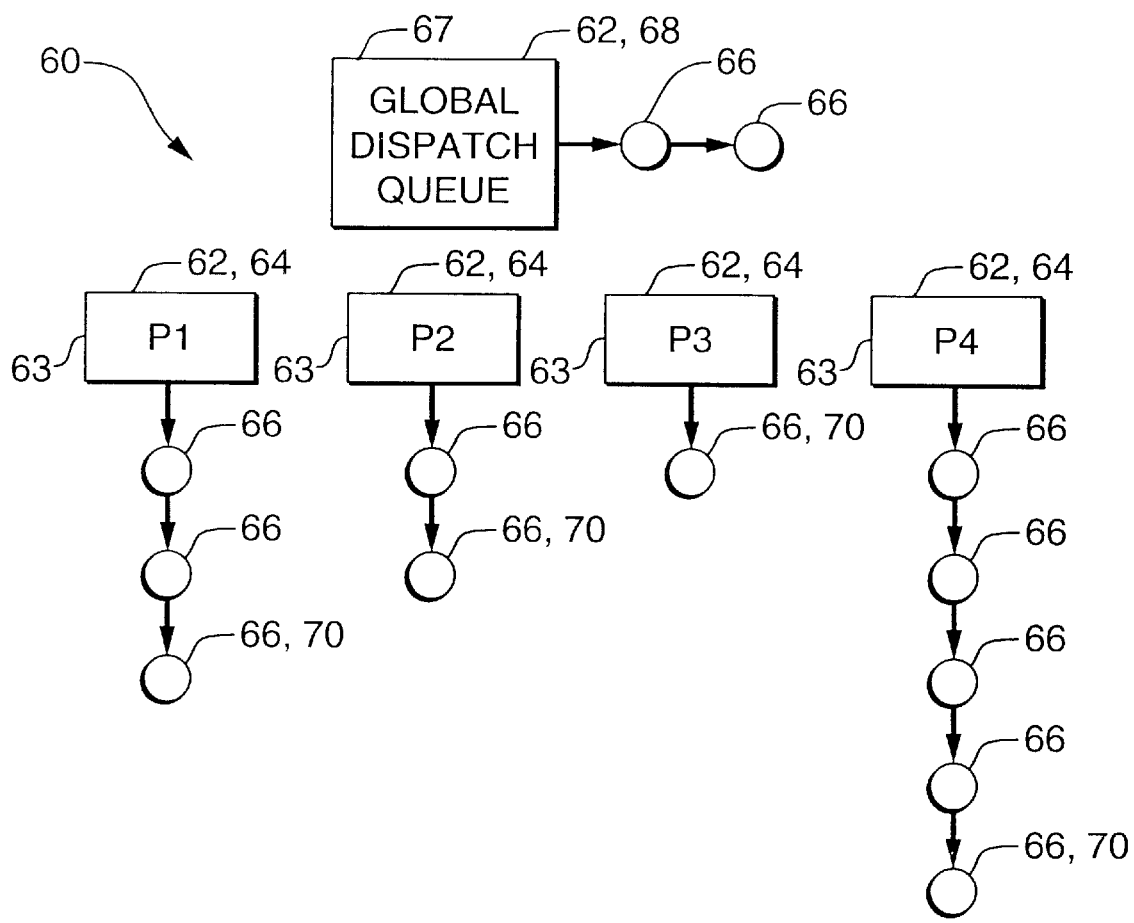
FIG. 5 is a diagram illustrating thread queues according to one embodiment of the present invention.

FIG. 5 illustrates a set of scheduling structures, indicated generally at 60, which includes several queues 62 according to the present invention. The processors (hereafter, 12, 24, or 34 in FIGS. 1–3 unless stated otherwise) of the multiprocessor may be divided into processor sets containing one or more processors each. However, for clarity of illustration the embodiments illustrated in the Figures assume one processor per processor set.

Each processor Pn (with n=1,2,3,4) has a processor thread queue control structure 63. One implementation of the queues 62 and control structures 63 according to the present invention includes the C and assembly. The code includes typedefs and corresponding assembly language declarations which define processor sets and related structures and data types, including without limitation processor_t, psm_t, PCBS, ResourceTagStructure, task_t, thread_desc_t, thread_t, and WorkToDoStructure.

Those of skill in the art will appreciate that the scope of the present invention is not limited to embodiments specifically illustrated in the source code provided herein. Those of skill will also readily determine the correspondence between C and assembly language versions of a given data structure or function. They will likewise readily determine when a C version, an assembly language version, a macro, or some other implementation of a function or data structure should be used in particular circumstances.

Each processor thread queue control structure 63 includes an unlocked local queue 64 which holds threads. 66 that are waiting for a processor. The set of scheduling structures 60 also includes a global thread queue control structure 67. The global control structure 67 includes a global dispatch queue 68 that also holds threads 66 which are waiting for a processor.

Most of the threads 66 are user-defined or otherwise created on behalf of a particular application program. However, the last thread 66 on each unlocked local queue 64 is an "idle" thread 70 created by the operating system according to the present invention. As used herein, "application thread" means a thread other than an idle thread. The idle thread 70 for a given queue 64 runs when no other work is available, that is, when a processor would otherwise be idle. Operation of the idle thread 70 is explained in detail hereafter.

Figure 6:
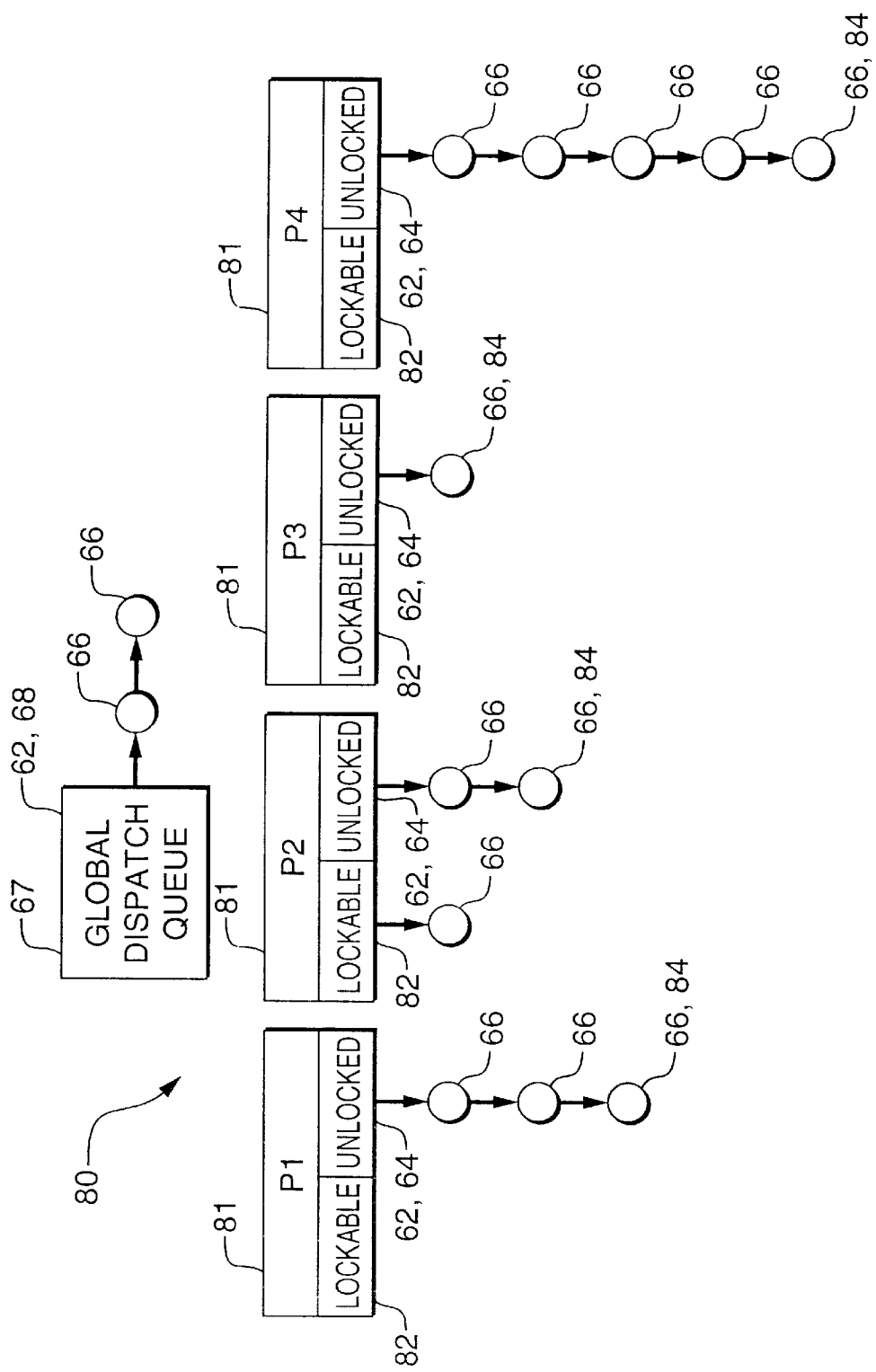
FIG. 6 is a diagram illustrating thread queues according to an alternative embodiment of the present invention.

FIG. 6 illustrates an alternative set of scheduling structures, indicated generally at 80, which also includes various queues 62 according to the present invention. Each processor Pn (with n=1,2,3,4) has a processor thread queue control structure 81 which includes both an unlocked local queue 64 of threads 66 awaiting a processor and a lockable local queue 82 of threads 66. This alternative set of scheduling structures 80 also includes a global dispatch queue 68 containing threads 66 awaiting a processor.

The last thread 66 on each unlocked local queue 64 is an idle thread 84 created by the operating system according to the present invention. The idle threads 84, like the idle threads 70 (FIG. 5), run when no other work is available. Operation of the idle thread 84 is explained in detail hereafter.

Figure 7:
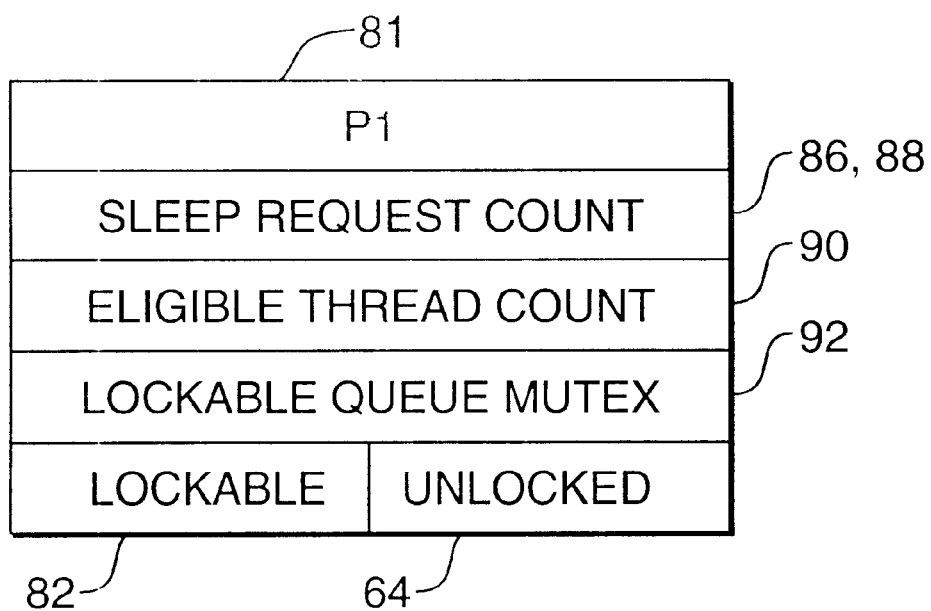
FIG. 7 is a diagram illustrating a processor thread queue control structure according to the present invention.

FIG. 7 further illustrates the processor thread queue control structure 81 for processor P1; the control structures 81 of the other processors are organized in a similar manner. The control structure 81 includes a load indicator 86 which indicates how heavily the corresponding processor is loaded. That is, the load indicator 86 provides a measure indicating how much of the available processing capacity is being spent running code in application threads 66 (FIG. 6) versus how much capacity is spent running the idle thread 84, waiting for I/O to complete, or otherwise supporting the application threads 66.

A presently preferred load indicator 86 includes a sleep request count 88 that indicates how often the threads 66 running on the corresponding processor have been suspended in mid-execution. Lower values in the sleep request count 88 indicate busier processors, and higher values indicate idler processors. Those of skill in the art will appreciate that other measures may also be used as load indicators 86, including without limitation, cycles spent in the idle thread 70, 84.

The processor thread queue control structure 81 also includes an eligible thread count 90. The value stored in the eligible thread count 90 is the total number of threads 66 currently in the unlocked local queue 64 which are ready to run. The queue 64 may also contain threads 66 which are not eligible because they are blocked awaiting I/O or some other resource or result. In one embodiment, the idle thread 84 is counted as eligible; in another it is not.

In addition, the processor thread queue control structure 81 includes a lockable queue mutex 92. Those of skill in the art are familiar with the general theory and implementation of semaphores, monitors, and similar mechanisms to protect the integrity of data structures by ensuring that critical regions of code which manipulate those data structures do not unintentionally interfere with one another. A mutex is a type of semaphore which is always either locked or unlocked.

A "lock" operation attempts to lock the mutex. If the mutex is unlocked, the lock operation succeeds. If two threads try at the same time to lock the same mutex, only one thread succeeds. If a thread tries unsuccessfully to lock a mutex, the thread blocks (sleeps) until the mutex is available and the lock succeeds. An "unlock" operation unlocks the mutex. A "trylock" operation, also known as a "spinlock" operation, also tries to lock the mutex. But trylock/spinlock returns a status code indicating failure, rather than blocking, if the lock attempt fails.

One suitable implementation of mutexes according to the present invention includes a C typedef such as the mutex_t typedef. This implementation also includes several C functions implementing operations on mutexes, including without limitation the following functions: mutex_init( ), mutex_sleep_alloc( ), mutex_destroy( ), mutex_destroy( ), mutex_sleep_free( ), mutex_link( ), mutex_unlink( ), mutex_lock( ), mutex_unlock( ), mutex_trylock( ), mutex_priority( ), mutex_owner( ), mutex_examine( ), sema_the_thread( ), rundown( ), thread_context( ), psm_context( ), SignalAndLinkMutex( ), _dis( ), _en( ), _cli( ), _sti( ), GetProcessorTable( ), atomic_inc( ), atomic_dec( ), lock_mutex( ), CPush( ), CPop( ), PutMutex( ), GetMutex( ), spin_lock( ), spin_unlock( ), and m_try_lock( ). Those of skill in the art will readily determine appropriate alternative implementations. In some alternative implementations, significant events such as acquisition and release of a mutex are logged to assist in debugging.

Figure 8:
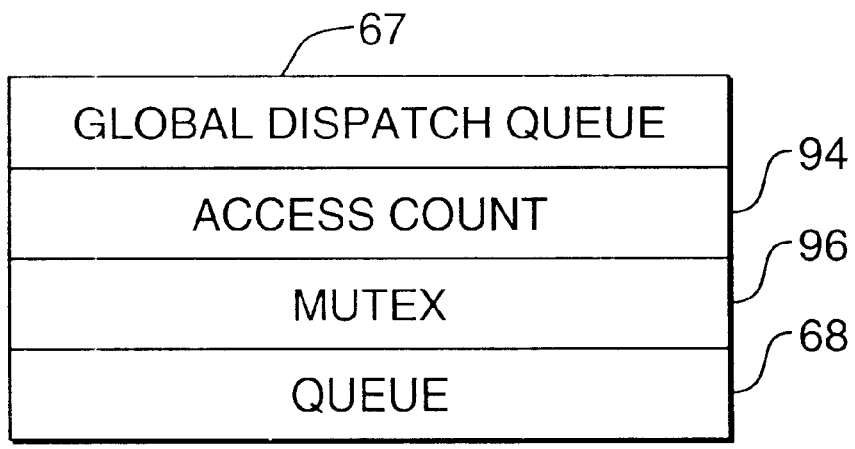
FIG. 8 is a diagram illustrating a global thread queue control structure according to the present invention.

FIG. 8 further illustrates the global thread queue control structure 67. The control structure 67 includes an access count 94 which holds an integer value indicating the number of recent attempts to access the global queue 68, as described below. The control structure 67 also includes a global queue mutex 96. The mutex 96 may be implemented using substantially the same techniques as those used to implement the lockable queue mutex 92 (FIG. 7).

Scheduling Steps Generally

With reference to FIGS. 5 and 6, in broad terms thread scheduling according to the present invention proceeds as follows. When a processor Pn becomes available, a scheduler for that processor searches the queues 62 to locate a thread 66 to run on that processor. The processor is then allocated to that thread 66. If no application threads 66 are ready to run, the search will locate one of the idle threads 70, 84. Otherwise, the first application thread 66 found will get the processor.

A processor may become available in any one of several ways. A thread 66 may finish executing or a thread 66 may voluntarily yield control to the operating system or to a named successor thread 66. In embodiments which utilize the present invention in connection with preemptive scheduling, a processor becomes available when a thread 66 is preempted by the operating system. One embodiment of software for accomplishing thread yielding operations includes the implementations of the function thr_yield( ); those of skill in the art will readily determine alternative implementations.

In searching the scheduling structures 60 shown in FIG. 5, the scheduler of the present invention looks first in the global dispatch queue 68. If a thread 66 is found, it gets the processor and the search ends. Otherwise, the scheduler checks the unlocked local queue 64 of the processor. If any application threads 66 are present, the first such application thread 66 is given the processor and the search ends. Otherwise, the idle thread 70 for the processor gets the processor.

Searches through the scheduling structures 80 shown in FIG. 6 proceed in substantially the same manner. However, the lockable local queue 82 is searched before the global dispatch queue 68. If no application thread 66 is found, the processor is given to the idle thread 84 for the processor.

In searching either set 60, 80 of scheduling structures, the present invention does not face the problems caused by using multiple prioritized queues such as those used in the Mach operating system. Eliminating explicit priority levels makes the present invention considerably cleaner than Mach in both theory and implementation.

In addition to steps relating to searching the queues 62, the present invention includes steps relating to the movement of threads 66 from the unlocked local queues 64 to the global dispatch queue 68. Because the scheduler searches the global dispatch queue 68 before the local unlocked queue 64, when a processor becomes available, moving a thread 66 from the local queues 64 to the global queue 68 increases the likelihood that the thread 66 will be allocated a processor.

In practice, threads 66 tend to stay on a given processor until the system load becomes very uneven, with some processors being very busy and other being mostly idle. This creates a "strong affinity" between threads 66 and processors which tends to increase cache usage and thereby improve system performance.

Scheduling Steps in Detail

Figure 9:
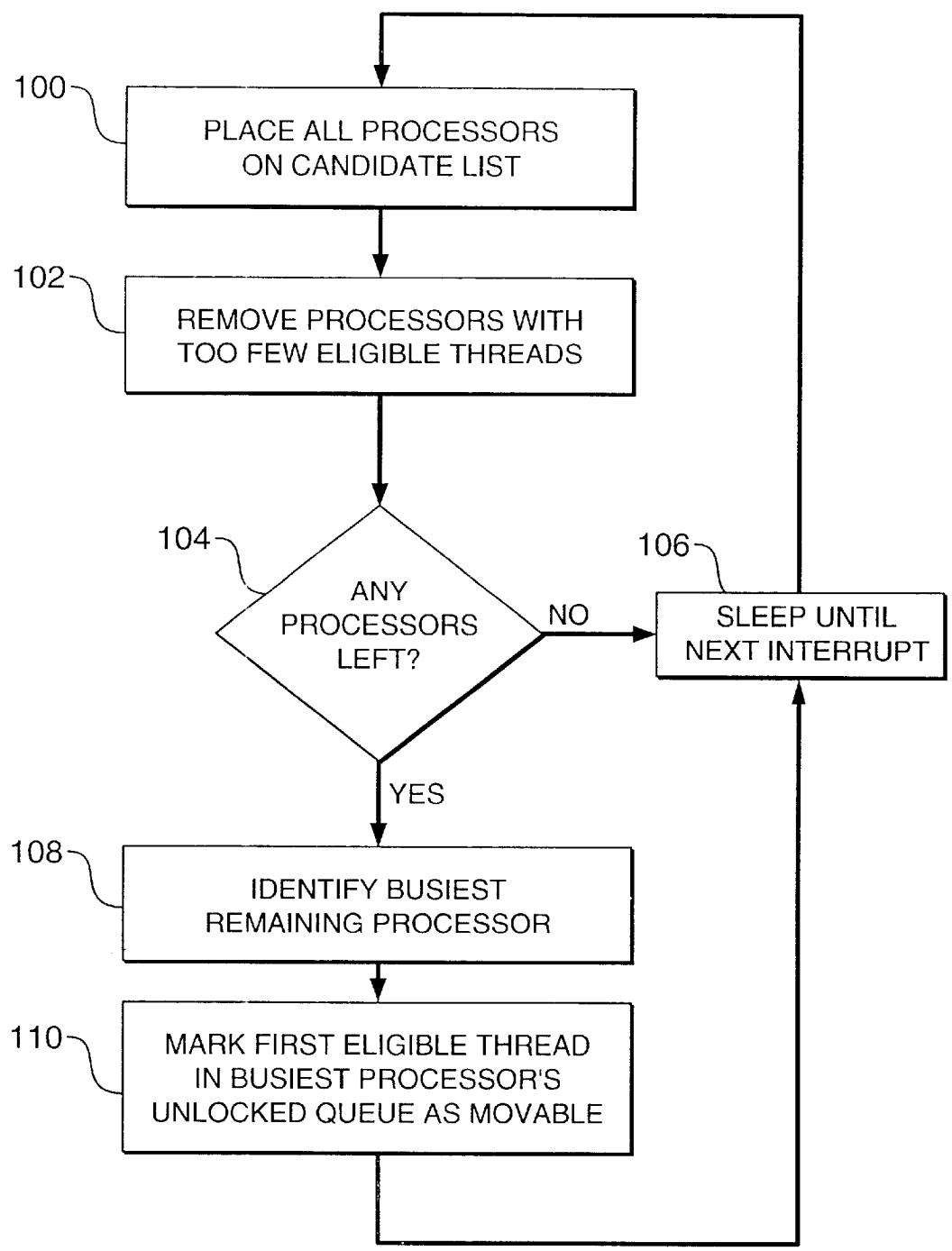
FIG. 9 is a flowchart illustrating thread scheduling steps according to the present invention.
Figure 10:
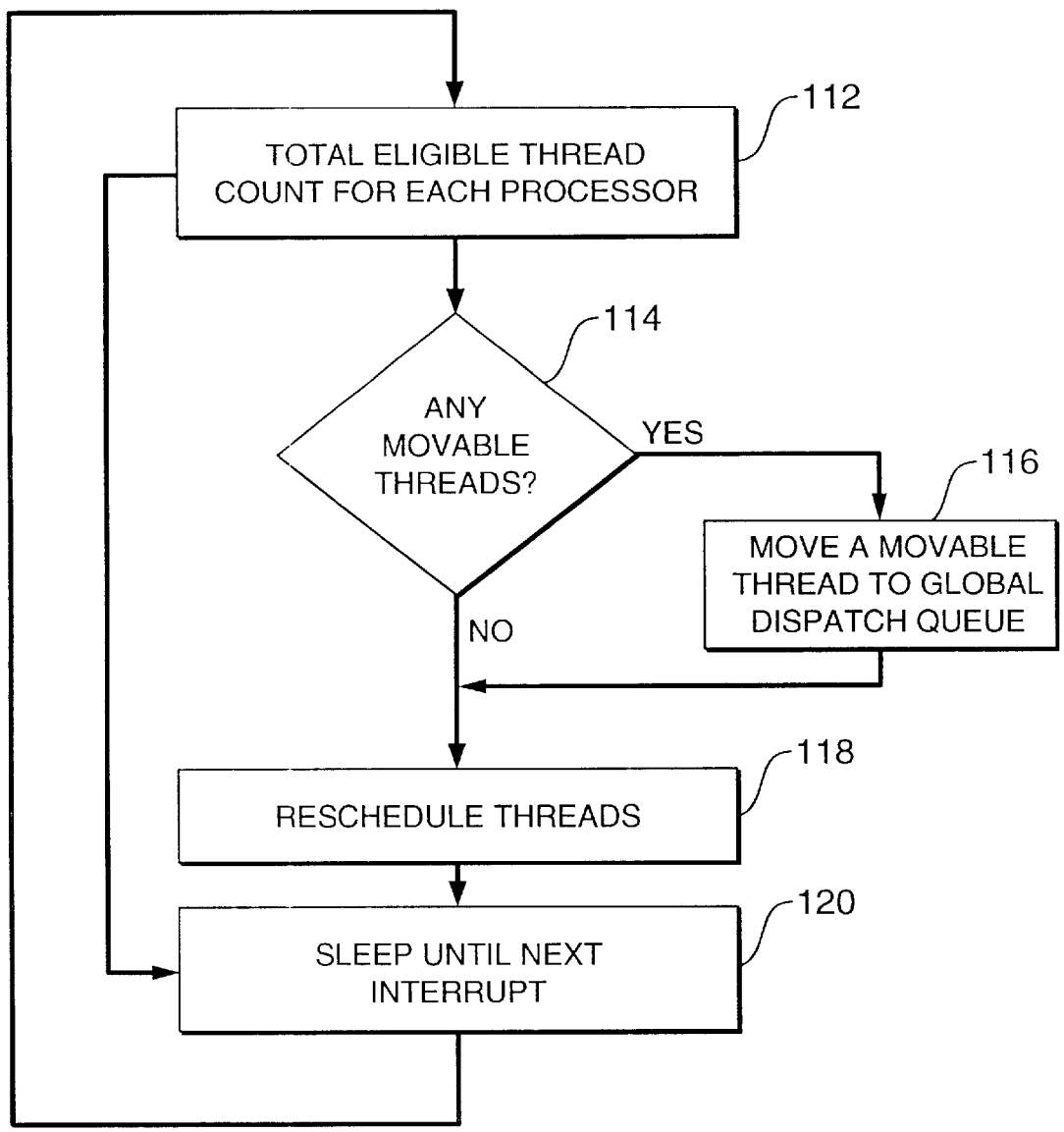
FIG. 10 is a flowchart illustrating additional thread scheduling steps according to the present invention.
Figure 11:
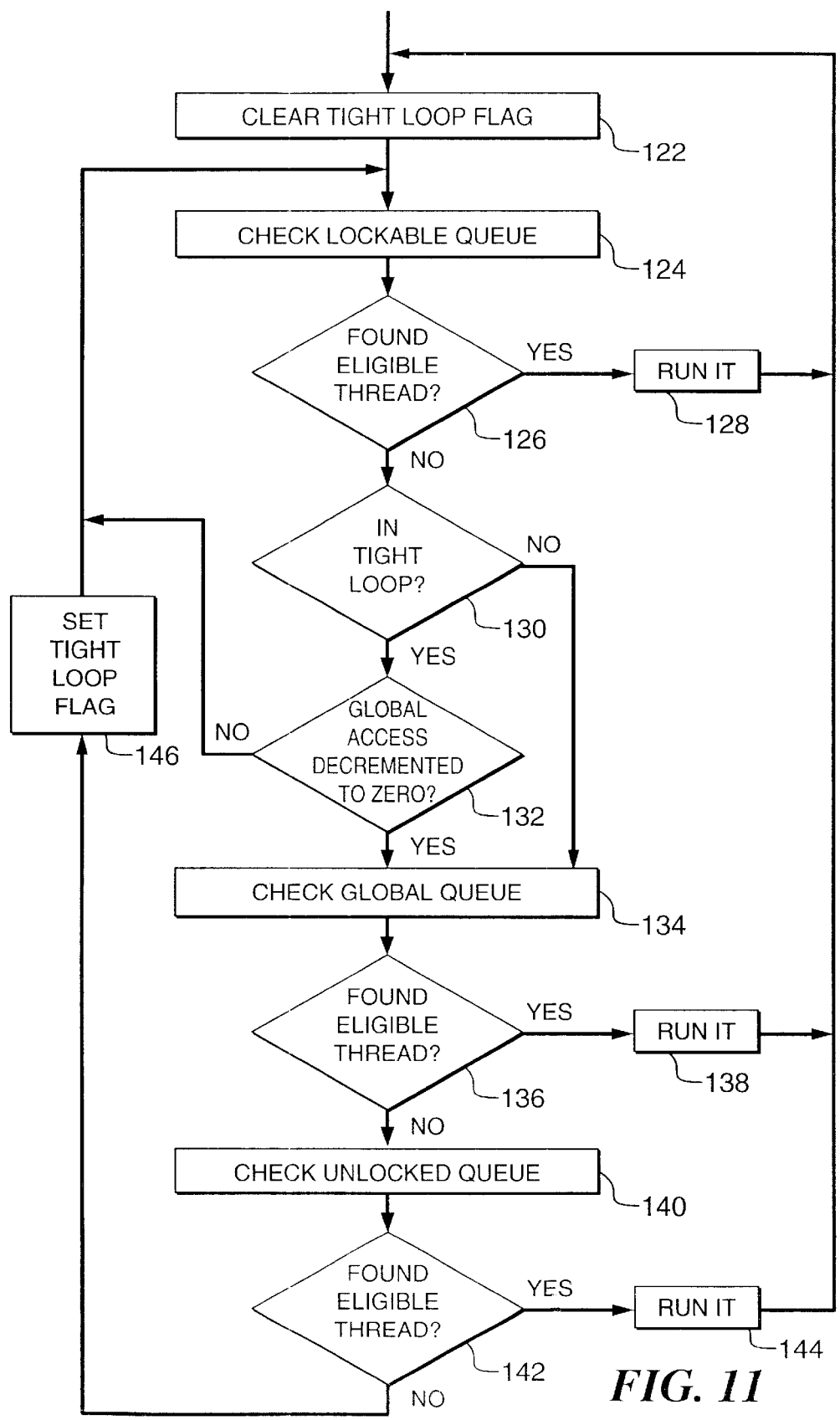
FIG. 11 is a flowchart further illustrating a "reschedule threads" step shown in FIG. 10.

FIGS. 9–11 illustrate specific thread scheduling steps according to the present invention. With reference to FIGS. 5, 6, and 9, the steps of FIG. 9 deal with marking threads 66 as candidates for movement from a local unlocked queue 64 to the global dispatch queue 68. Referring next to FIGS. 5, 6, and 10, the steps of FIG. 10 deal both with the movement of a marked thread 66 to the global queue 68 and with the search for a thread 66 to receive use of an available processor. Referring finally to FIGS. 5, 6, and 11, the steps of FIG. 11 further illustrate the search for a thread 66 to run on the available processor.

In one embodiment, thread scheduling is accomplished by three separate threads, each of which performs the steps shown in one of the three FIGS. 9–11. In some alternative embodiments, the steps shown in two of the Figures are performed at different times by one thread and the steps shown in the third Figure are performed by a second thread. In other alternative embodiments, a single thread performs all the steps at different times, in round-robin fashion.

With reference to FIG. 9, the present invention includes a step 100 which places all processors in all processor sets on a list of candidate processors. The list may be implemented using a linked list, an array, a bitset, or other familiar techniques. A subsequent step 102 removes from the list all processors which have too few eligible threads. Lack of sufficient eligible threads is assessed by comparing the eligible thread count 90 (FIG. 7) with a predetermined threshold value. A presently preferred threshold value is configurable in the range from two to 10, with a default value of two, but those of skill in the art will readily determine whether different threshold values produce better system performance in particular circumstances.

A querying step 104 then determines whether any processors remain on the list. If no queue 64 has more than the threshold number of threads 66 waiting to run, no processors will remain on the list. Software implementing the present invention then performs a sleeping step 106 until a later clock tick-based interrupt restarts the software so that it may again perform any required steps according to the process of FIG. 9 or an equivalent process.

With reference to FIGS. 5–7 and 9, if one or more processors remain on the list, the querying step 104 is followed by a step 108 which identifies the busiest processor remaining on the list. In embodiments using sleep request counts 88 as load indicators 86, the busiest processor is the processor having the lowest value in its sleep request count 88.

During a step 110, the first eligible thread 66 in the unlocked local queue 64 of the busiest processor is then marked as "movable." Marking may be accomplished by setting a bitflag or other familiar means. Only movable threads 66 are moved to the global dispatch queue 68, but not every thread marked movable will actually be moved.

With reference to FIGS. 5–10, a step 112 regularly updates status information in the scheduling structures 60, 80, including the total eligible thread count 90 for each processor. Update occur once per "small time quantum." In one presently preferred embodiment, the step 112 is performed by an interrupt service routine (timer ISR) about eighteen times per second, so the small time quantum is about one-eighteenth of one second. Those of skill in the art will readily determine how often the step 112 should be performed in particular circumstances.

A step 114 regularly checks for movable threads 66 in the unlocked local queues 64. The step 114 is preferably performed once about every "large time quantum," where the large time quantum is significantly larger than the small time quantum so that the step 114 is performed much less often than the step 112. In one presently preferred embodiment, the large time quantum is about two seconds, and the step 114 is performed by an interrupt service routine about once every two seconds. In one embodiment the step 114 is performed by an idle thread 70, 84 which contains the local scheduler for a given processor and context-switching code. Those of skill in the art will readily determine how often the step 112 should be performed in particular circumstances.

The steps 112 and 114 may be performed independently of one another such that the sequence of operation during any particular period of time being step 112 alone, step 114 alone, step 112 followed by step 114, or step 114 followed by step 112. Indeed, except in those instances where one step is expressly conditioned upon another, the steps of the present invention may be performed in isolation from one another or in orders which differ from the examples shown in the Figures.

If any movable threads 66 are found during the step 114, one of those movable threads 66 is moved to the global dispatch queue 68 during a step 116. In one embodiment, the most convenient movable thread 66 is moved; in other embodiments, the movable thread 66 that has waited longest or the moveable thread 66 that is waiting for the busiest processor is moved. The thread 66 being moved is added to the global dispatch queue 68 only after the code moving the chosen thread 66 has locked the global dispatch queue mutex 96; the mutex 96 is unlocked after the chosen thread 66 has been moved. No mutex is needed for the unlocked local queues 64 because they are accessed only by the local scheduler for the processor in question.

During a step 118 the queues 62 are searched to locate the next eligible thread 66, and the processor is allocated to that thread 66. The step 118 is described in detail below in connection with FIG. 11. After the step 118, or the more frequent step 112, software implementing the steps of FIG. 10 performs a sleeping step 120 until a later clock tick-based interrupt restarts the software so that it may again perform any required steps according to FIG. 10 or an equivalent process.

With reference to FIGS. 5–8, 10, and 11, a step 122 initially clears a "tight loop" flag whose purpose is to limit the frequency of access to the global dispatch queue 68. Clearing the tight loop flag indicates that code implementing the invention should not execute in a tight loop that excludes a check for threads 66 in the global queue 68.

During a step 124, the scheduler checks the lockable local queue 82 for a thread 66 to run. If an eligible thread 66 is found, it is removed from the lockable local queue 82 during a step 126 and given control of the processor during a step 128. The thread 66 is removed only after the code removing the chosen thread 66 has locked the lockable queue mutex 92. The mutex 92 is unlocked after the chosen thread 66 has been removed.

If no eligible thread 66 is found in the lockable local queue 82, a step 130 determines whether the tight loop flag is set. If the flag is set, access to the global dispatch queue 68 is denied until the scheduler has completed a predetermined number of passes through the tight loop. The number of passes completed is kept in the global dispatch queue access count variable 94. In one presently preferred embodiment, the access count 94 (also known as the "handicap") is initially set to four; other appropriate values are readily determined by those of skill in the art. The access count 94 is decremented during a step 132 each time a pass through the tight loop comprising steps 124–132 is completed.

In one preferred alternative embodiment, the access count is per processor and is kept in an expanded version of the structure 81 rather than being per global dispatch queue and being kept in the structure 67. That is, a separate access count is kept for each processor rather than a single access count being kept for all processors.

If the access count 94 reaches zero in the tight loop, or if the tight loop flag is not set, then a step 134 checks the global dispatch queue 68 for an eligible thread. If a thread 66 is found, it is removed from the global dispatch queue 68 during a step 136 and given control of the processor during a step 138. The thread 66 is removed only after the code removing the chosen thread 66 has locked the global dispatch queue mutex 96. The mutex 96 is unlocked after the chosen thread 66 has been removed.

If no eligible thread is found in the global dispatch queue 68, the unlocked local queue 64 is checked during a step 140. If an eligible thread 66 other than an idle thread 70, 84 is found, that eligible thread 66 is removed from the unlocked local queue 64 during a step 142 and given control of the processor during a step 144. No mutex guards access to the unlocked local queue 64 because that queue 64 is accessed only by code running on the processor in question.

If the only eligible thread 66 found in the unlocked local queue 64 is the idle thread 70, 84, then control of the processor goes to or remains with the idle thread 70, 84. A presently preferred embodiment runs the search portions of the scheduler as part of the idle thread 70, 84. The available processor runs the idle thread 70, 84 to find a successor thread. Control of the processor thus remains with the idle thread 70, 84 through a step 146 that sets the tight loop flag and through the subsequent searches described above until another eligible thread 66 is located and given control of the processor. In one embodiment of the present invention, the code running on the idle thread 70, 84 includes the function worker_thread( ) and/or mk_worker_thread( ). Those of skill in the art will readily determine alternative embodiments.

In one embodiment, the idle thread code is initialized by operating system code which includes the functions SMP_START( ), SMPMainTHread( ), SMPAddProcessor( ), and engine_init( ), and supporting code. Those of skill in the art will readily determine alternative approaches to initialization of a multiprocessor system according to the present invention.

One embodiment of the thread scheduling steps of the present invention includes the following code for transferring control of the processor and performing related steps: context_switch( ), thread_switch( ), thread_lock( ), thread_unlock( ), thread_start( ), shutdown( ), task_lock( ), task_unlock( ), get_target_and_switch( ), reaper_thread( ), pset_remove_task( ), pset_remove_thread( ), context_halt( ), ProcessFastWorkToDos( ), and related code. Those of skill in the art will readily determine alternative embodiments according to the present invention.

Conclusion

In summary, the present invention provides a method and apparatus for thread scheduling which reduces the movement of threads between processors in a multiprocessor. Threads are moved to a different processor only after being moved from an unlocked local queue into the global dispatch queue and thence to another processor. Threads are marked movable only if they are eligible to run and if they are in an unlocked local queue that has more than a predetermined number of eligible threads. Moreover, even if several threads are marked movable, at most one thread is moved to the global dispatch queue in each large time quantum.

These and other features of the invention create a strong affinity between threads and processors so that threads tend to remain on the same processor unless the queues for different processors vary substantially in size from one another. This strong affinity improves system performance significantly on multiprocessor systems which have one or more processor caches.

The present invention also reduces the time during which processors in a multiprocessor are unable to work because thread scheduling is underway. Use of lockable thread queues is minimized, so fewer locks are asserted on the system bus. Each processor also preferably has its own scheduler.

Those of skill will appreciate that preferred embodiments of the present invention report errors and other conditions which interfere with the invention as it assists users in recovering files. Suitable error reporting and recovery means are readily determined by those of skill in the art. Suitable techniques for diagnosing and debugging implementations of the present invention are likewise readily determined by those of skill in the art.

With reference to all Figures, articles of manufacture within the scope of the present invention include a computer-readable storage medium such as the medium 19 in combination with the specific physical configuration of a substrate of the computer-readable storage medium. The substrate configuration represents data and instructions, including without limitation the data structures and instructions illustrated and discussed in connection with FIGS. 5–11, which cause the multiprocessors 10, 20, 30 to operate in a specific and predefined manner as described herein. Suitable storage devices include floppy disks, hard disks, tape, CD-ROMS, RAM, and other media readable by a multiprocessor. Each such medium tangibly embodies a program, functions, and/or instructions that are executable by the multiprocessor to perform thread scheduling steps of the present invention substantially as described herein.

Although particular apparatus and article embodiments of the present invention are expressly illustrated and described herein, it will be appreciated that additional and alternative apparatus and article embodiments may be formed according to methods of the present invention. Similarly, although particular method steps of the present invention are expressly described, those of skill in the art may readily determine additional and alternative steps in accordance with the apparatus and articles of the present invention. Unless otherwise expressly indicated, the description herein of methods of the present invention therefore extends to corresponding apparatus and articles, and the description of apparatus and articles of the present invention extends likewise to corresponding methods.

Section headings herein are for convenience only. The material under a given section heading is not necessarily the only material herein on that topic, nor is it necessarily limited only to material on that topic.

The invention may be embodied in other specific forms without departing from its essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed is:

1. A method for scheduling the execution of a plurality of threads on a plurality of processors in a computer system, wherein at least one of the threads can make more than one sleep request, said method comprising the steps of associating a local queue of threads with each of the processors; selecting movable threads from the local queues; and on each of the processors, performing the step of yielding control of the processor to a thread that is selected from at least the selected movable threads, wherein said step of selecting movable threads comprises identifying a busiest processor among the plurality of processors, the movable threads being selected only from eligible threads in the local queue of the busiest processor, and wherein said identifying step comprises identifying as a busiest processor a processor which has received the smallest number of sleep requests of any of the processors during a sampling period.

2. The method of claim 1, wherein said associating step associates an unlocked local queue of threads with each of the processors.

3. A method for scheduling the execution of a plurality of threads on a plurality of processors in a computer system, said method comprising the steps of associating an unlocked local queue of threads with each of the processors; selecting movable threads from the unlocked local queues; and on each of the processors, performing the step of yielding control of the processor to a thread that is selected from at least the selected movable threads, wherein said step of selecting movable threads comprises identifying a busiest popular processor among the plurality of processors, a processor being popular when its unlocked local queue contains at least a predetermined number of eligible threads, the movable threads being selected only from eligible threads in the unlocked local queue of the busiest popular processor, wherein said identifying step comprises identifying as a busiest popular processor a popular processor which has received the smallest number of sleep requests of any of the popular processors during a sampling period.

4. A method for scheduling the execution of a plurality of threads on a plurality of processors in a computer system, said method comprising at least three control yielding steps for limiting the relative frequency of global dispatch queue accesses, including currently yielding control to an eligible thread found in a global dispatch queue, wherein during a previous yielding step control was yielded to an eligible thread found at that time in the global dispatch queue, and wherein control has been yielded at least once to a thread in a local queue by an intermediate control yielding step between said previous yielding step which previously yielded to a thread found in the global dispatch queue and said step of currently yielding control which currently yields to a thread found in the global dispatch queue.

5. A method for scheduling the execution of a plurality of threads on a plurality of processors in a computer system, said method comprising associating a local queue of threads with each of the processors; maintaining a global dispatch queue of threads which are not presently associated with any processor, and searching at least a portion of the global dispatch queue and the local queue of the processor to locate an eligible thread, wherein said searching step comprises:
    checking the local queue of the processor for an eligible thread;
    determining whether checking the global dispatch queue will exceed a predetermined relative frequency for global dispatch queue accesses relative to local queue accesses; and
    checking the global dispatch queue only if such checking will not exceed the predetermined relative frequency for global dispatch queue accesses relative to local queue accesses and if no eligible thread is found in the local queue.

6. An apparatus for scheduling the execution of threads, comprising:
    a plurality of processors for executing instructions, each of said processors being assigned to exactly one processor set, at least one of said processor sets having a plurality of assigned processors;
    a shared memory for holding data;
    a bus connecting said processors with said shared memory such that each of said processors can read and write locations within said shared memory;
    an unlocked local queue of threads associated with each of said processors or processor sets;
    a global dispatch queue of threads which are not presently associated with any of said processors;
    means for selecting movable threads from said unlocked local queues, including a means for identifying a popular processor or processor set among the plurality of processors or processor sets, a processor or processor set being popular when its unlocked local queue contains at least a predetermined number of eligible threads;
    on each of said processors, means for yielding control of said processor to a thread that is selected by the means for selecting movable threads from popular processors or processor sets; and
    a plurality of load indictors, each of said load indicators associated with one of said processor sets for identifying a busiest processor set among said plurality of processor sets, wherein at least one of said load indicators indicates the number of sleep requests received by said associated processor set during a sampling period.

7. An apparatus for scheduling the execution of threads, comprising:
- a plurality of processors for executing instructions, each of said processors being assigned to exactly one processor set, at least one of said processor sets having a plurality of assigned processors;
- a shared memory for holding data;
- a bus connecting said processors with said shared memory such that each of said processors can read and write locations within said shred memory;
- an unlocked local queue of threads associated with each of said processors or processor sets;
- a global dispatch queue of threads which are not presently associated with any of said processors;
- means for selecting movable threads from said unlocked local queues, including a means for identifying a popular processor or processor set among the plurality of processors or processor sets, a processor or processor set being popular when its unlocked local queue contains at least a predetermined number of eligible threads;
- on each of said processors, means for yielding control of said processor to a thread that is selected by the means for selecting movable threads from popular processors or processor sets;
- a plurality of lockable local queues of threads, each of said lockable local queues of threads being associated with one of said processor sets; and
- a means for searching in a predetermined order at least a portion of one of said lockable local queues, said global dispatch queue, and one of said unlocked local queues, to locate an eligible thread, wherein said searching means determines whether checking the global dispatch queue will exceed a predetermined relative frequency for global dispatch queue accesses, and checks said global dispatch queue only if such checking will not exceed the predetermined relative frequency for global dispatch queue accesses and if no eligible thread is found in said lockable local queue.

8. An apparatus for scheduling the execution of threads, comprising:
- a plurality of processors for executing instructions, each of said processors being assigned to exactly one processor set, at least one of said processor sets having a plurality of assigned processors;
- a shared memory for holding data;
- a bus connecting said processors with said shared memory such that each of said processors can read and write locations within said shared memory;
- an unlocked local queue of threads associated with each of said processors or processor sets;
- a global dispatch queue of threads which are not presently associated with any of said processors;
- means for selecting movable threads from said unlocked local queues, including a means for limiting the relative frequency of access to said global dispatch queue; and
- on each of said processors, means for yielding control of said processor to a thread that is selected by the means for selecting movable threads while limiting the frequency of global dispatch queue accesses relative to local queue accesses.

9. The apparatus of claim 8, wherein said means for limiting the relative frequency of access comprises an access counter, means for initializing said access counter, means for decrementing said access counter, and means for testing the value of said access counter.

10. A method for scheduling the execution of a plurality of threads on a plurality of processors in a computer system, said method comprising the steps of:
- identifying a busiest processor, the busiest processor having spent a higher proportion of its processing capacity running application threads versus running an idle thread relative to a plurality of other processors in the computer system;
- searching in a predetermined order at least a portion of an unlocked local queue of the busiest processor to locate an eligible thread; and
- yielding control of a processor other than the busiest processor to an eligible thread found during said searching step, the eligible thread which receives control of the processor being selected only from eligible threads in the unlocked local queue of the busiest processor.

11. A computer-readable storage medium having a configuration that represents data and instructions which cause a multiprocessor to perform method steps for scheduling threads, the method comprising at least three control yielding steps for limiting the relative frequency of global dispatch queue accesses, including currently yielding control to an eligible thread found in a global dispatch queue, wherein during a previous yielding step control was yielded to an eligible thread found at that time in the global dispatch queue, and wherein control has been yielded at least once to a thread in a local queue by an intermediate control yielding step between said previous yielding step which previously yielded to a thread found in the global dispatch queue and said step of currently yielding control which currently yields to a thread found in the global dispatch queue.

* * * * *